July 11, 1967     F. J. DRUGER, JR     3,330,608
FISHING TACKLE BOX
Filed Oct. 21, 1965     5 Sheets-Sheet 1
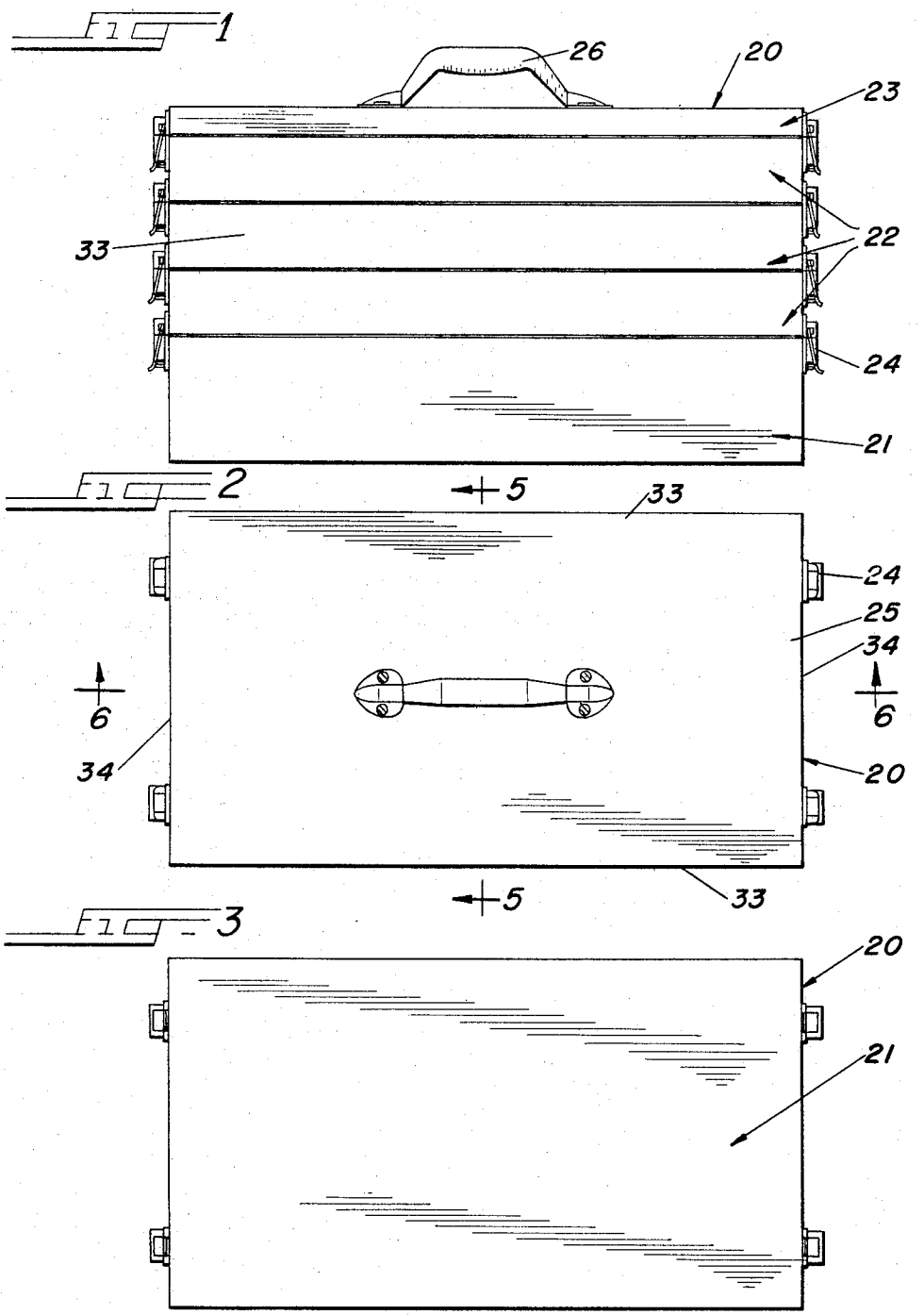

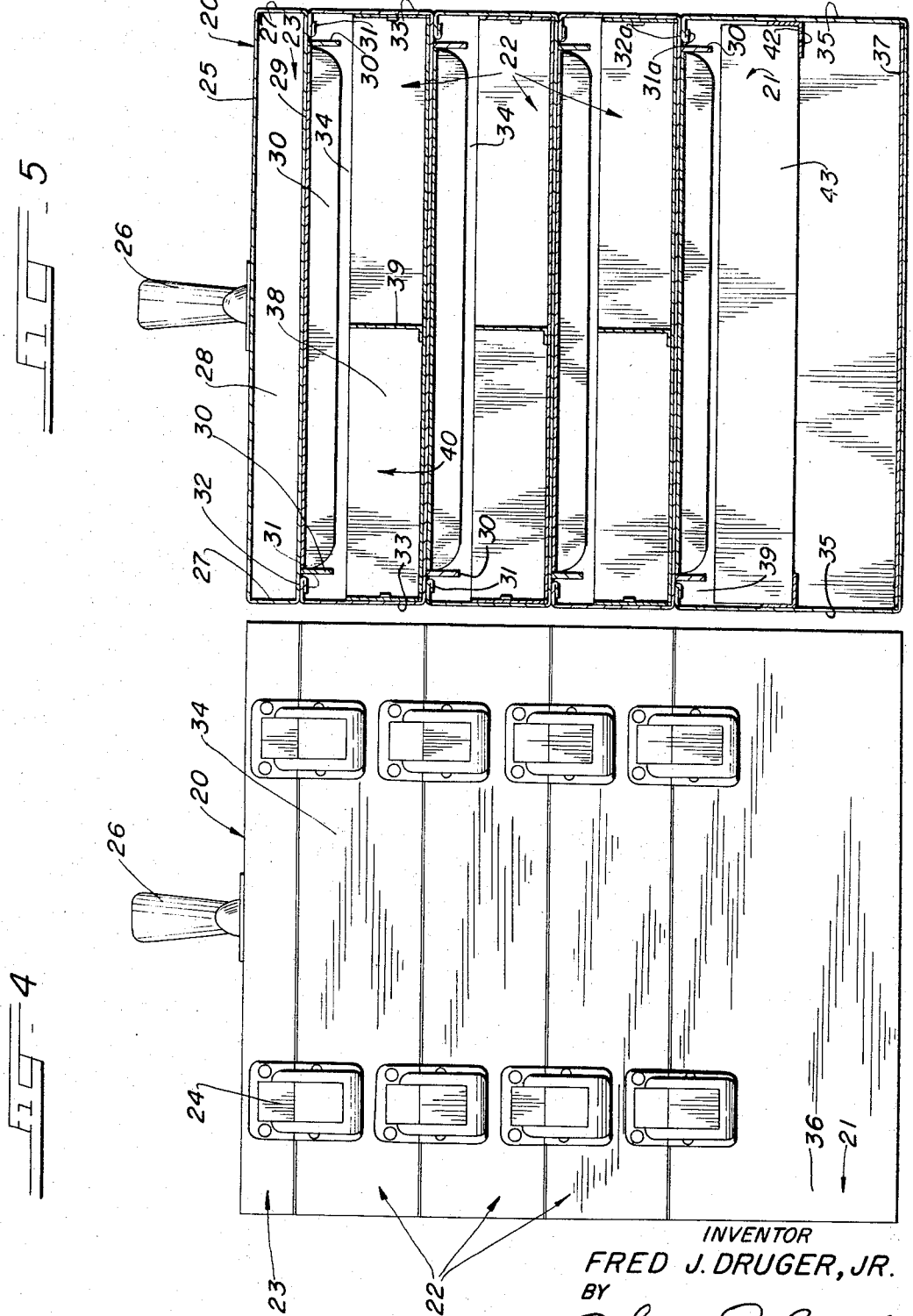

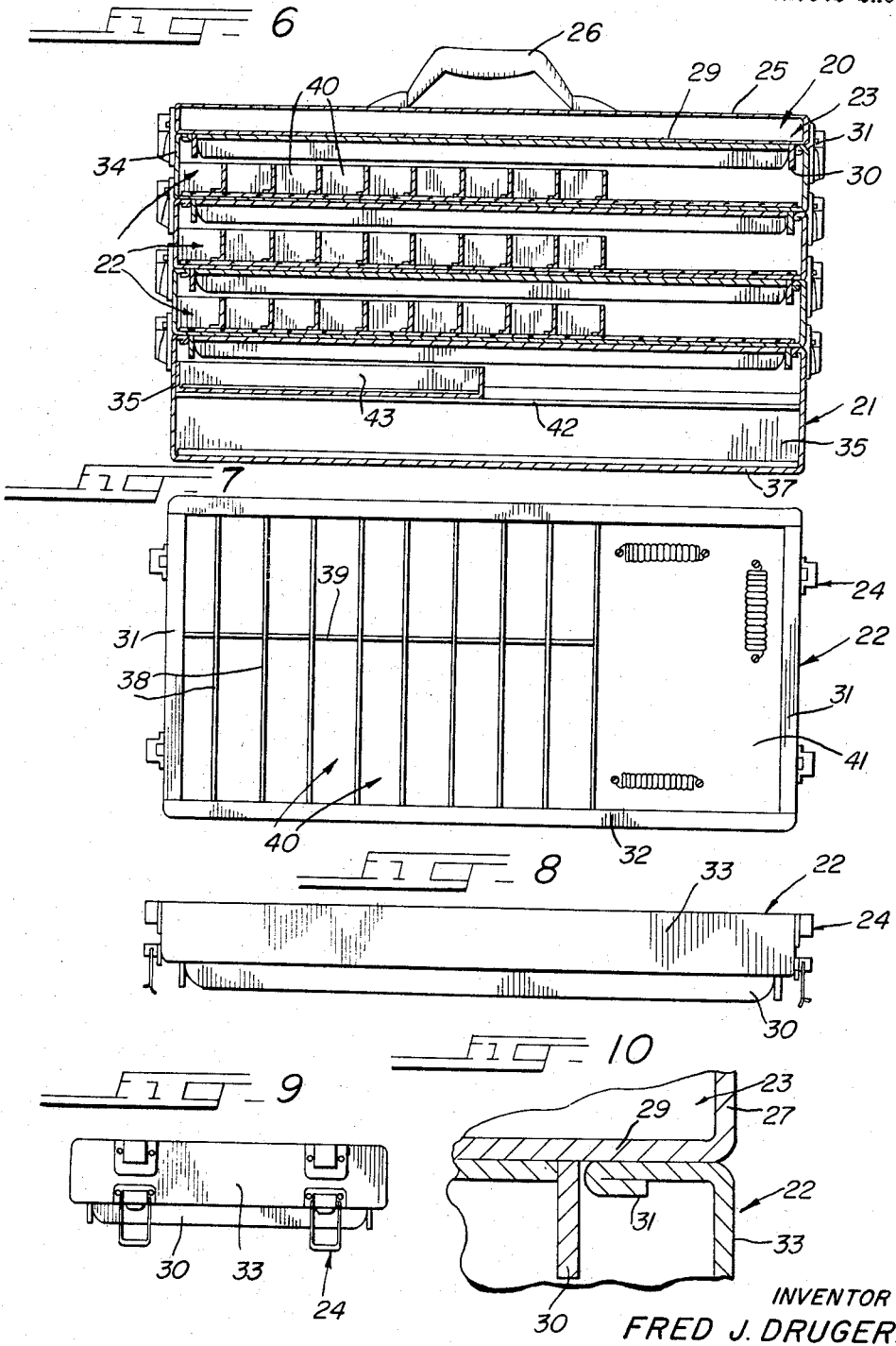

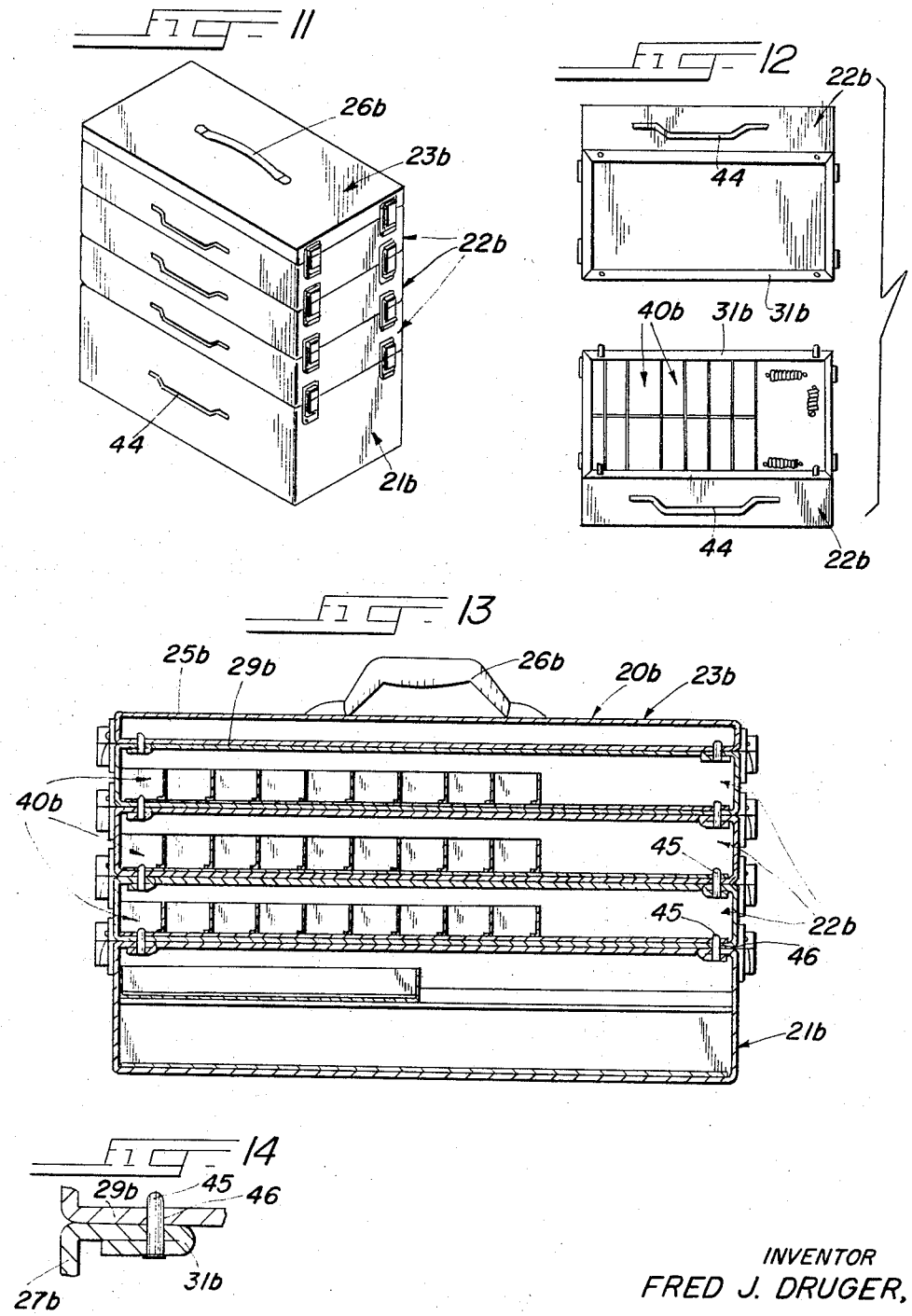

July 11, 1967  F. J. DRUGER, JR  3,330,608
FISHING TACKLE BOX
Filed Oct. 21, 1965  5 Sheets-Sheet 5
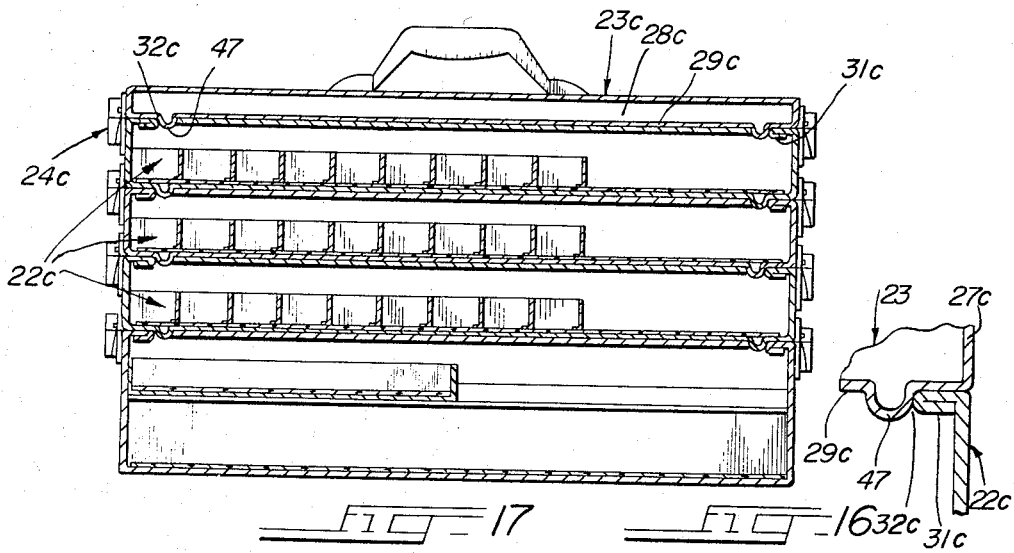
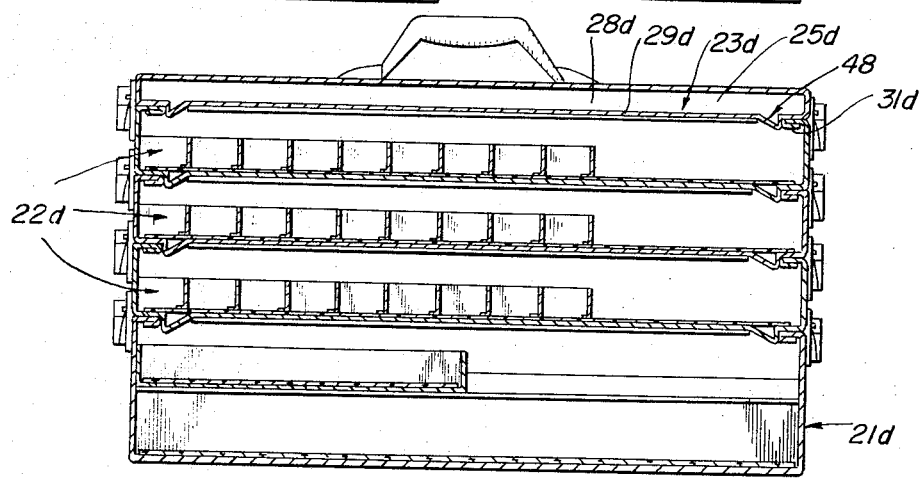
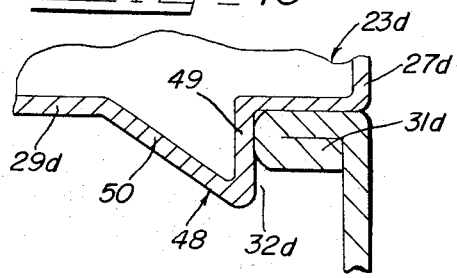
INVENTOR
FRED J. DRUGER, JR.
BY
Charles B. Cannon
ATTY.

United States Patent Office 3,330,608
Patented July 11, 1967

3,330,608
FISHING TACKLE BOX
Fred J. Druger, Jr., 2510 Silvercreek Drive,
Franklin Park, Ill. 60131
Filed Oct. 21, 1965, Ser. No. 500,097
3 Claims. (Cl. 312—111)

This invention relates to fishing tackle boxes or containers.

Various forms of fishing tackle boxes and containers have been known and used heretofore and among these are those which are so-called side opening, that is, open out laterally with a so-called accordion fold. However, one of the difficulties experienced in use of such prior side or laterally opening fishing tackle boxes or containers is that fact that when they are used in rowboats, and like places, they require a considerable amount of space because of their side or lateral opening construction, and this presents a problem where space is limited as, for example, in a rowboat.

An additional problem experienced in the use of prior fishing tackle boxes or containers is that they have commonly been so constructed that they have afforded either more space or less space than is needed by the user and hence have not readily been adaptable to the needs of a fisherman under all circumstances.

Accordingly, an object of the present invention is to provide a new and improved fishing tackle box or container which is top opening and which in use requires a minimum amount of space when used in a rowboat or like place where space is limited.

Another object of the invention is to provide a new and improved fishing tackle box or container which is so designed and constructed that it may be adjusted or adapted as to size to fit the space needs of a fisherman under all circumstances, depending, in part, upon the amount of fishing tackle equipment, and the like, the user wishes to carry therein.

A further object of the invention is to provide a novel fishing tackle box including a novel assembly of sectional boxes or trays nested together one upon the other.

An additional object of the invention is to provide therein novel means for holding the multiple sectional units or trays of the new fishing tackle box or container in nested or assembled position of use in the complete multiple fishing tackle box or container.

Other objects will appear hereinafter.

In the drawings:

FIG. 1 is a side elevational view illustrating a typical form of the new multiple unit fishing tackle box or container;

FIG. 2 is a top plan view thereof;

FIG. 3 is a bottom plan view of the multiple unit fishing tackle box or container illustrated in FIGS. 1 and 2;

FIG. 4 is an end elevational view of the new multiple fishing tackle box or container as seen from the right-hand end in FIGS. 1 and 2;

FIG. 5 is a vertical transverse sectional view on line 5—5 in FIG. 2;

FIG. 6 is a longitudinal vertical sectional view on line 6—6 in FIG. 2;

FIG. 7 is a top plan view of one of the multiple sectional units or trays embodied in the new multiple unit fishing tackle box or container illustrated in FIGS. 1 to 6, inclusive;

FIG. 8 is a side elevational view of one of the multiple sectional units or trays as illustrated in FIG. 7;

FIG. 9 is an end elevational view of one of the multiple sectional units or trays as illustrated in FIGS. 7 and 8;

FIG. 10 is an enlarged sectional detail view illustrating one form of the novel means embodied in the present invention for holding the sectional units or trays in nested or assembled condition;

FIG. 11 is a perspective view of a modification of the new multiple sectional fishing tackle box or container;

FIG. 12 is an exploded perspective view of certain of the sectional units or trays embodied in the modification of the invention illustrated in FIG. 11;

FIG. 13 is a central vertical longitudinal sectional view of another modification of the invention and of the means for retaining the multiple sectional units or trays in assembled position;

FIG. 14 is an enlarged sectional detail view of the area indicated by the legend "FIG.14" in FIG. 13 and illustrating another form of the novel means for holding the multiple sectional units or trays in assembled or nested position;

FIG. 15 is a central vertical longitudinal sectional view of another modification of the invention and illustrating another form of the novel means embodied in the present invention for holding the multiple sectional units or trays in nested or assembled relationship;

FIG. 16 is an enlarged sectional detail view illustrating another form of the novel means embodied in the present invention for holding the multiple sectional units or trays in assembled or nested condition.

FIG. 17 is a longitudinal vertical sectional view of another modification of the invention and illustrating another form of the novel means embodied in the present invention for holding the multiple sectional units or trays in assembled or nested condition; and FIG. 18 is an enlarged sectional detail view illustrating another form of the novel means embodied in the present invention for holding the multiple sectional units or trays in assembled or nested condition.

A typical embodiment of the new multiple unit fishing tackle box or container is illustrated in FIGS. 1 to 10, inclusive, of the drawings, wherein it is generally indicated at 20, and includes a lowermost or bottom sectional unit 21, intermediate sectional units 22, and an uppermost or top sectional unit 23, all of which are generally rectangular in shape and box-like in form and may be made from sheet metal, steel or aluminum stampings, or molded from plastic resinous material, or the like.

As shown in FIGS. 1 to 6, inclusive, the assembled sectional units 21, 22 and 24 are separably retained in assembled or nested condition by suitable latching means in the form of hasp latch units, generally indicated at 24, and which are mounted on the end walls of the sectional units 21-22-24 to retain them in assembled condition. The top or uppermost sectional unit 23 is provided with a suitable handle 26 for carrying the entire assembled multiple sectional fishing tackle box or container 20.

The uppermost or top sectional unit 23 includes a top wall 25, end walls 27, side walls 28 and a bottom wall 29, and a vertically extending marginal depending flange member 30 is formed integrally with and is preferably stamped out of the bottom wall 29 of the uppermost sectional unit 23 within the area defined by the end walls 27 and side walls 28 of the top sectional unit 23 (FIG. 5).

A similar bottom wall and depending marginal flange construction is provided in each of the intermediate sectional units 22 (FIG. 5). Each of the intermediate sectional units 22 includes side walls 33 and end walls 34 and each of these side walls 23 and end walls 34 is provided with an inwardly and horizontally extending marginal flange 31 at the upper edge thereof. Each of these inwardly and horizontally extending marginal flange members 31 defines a generally rectangular shaped opening 32 for the reception of the vertically extending marginal flange member 30 on the bottom wall 29 of the next adjacent sectional unit thereabove (FIGS. 5 and 10).

Similarly, the bottom sectional unit 21 includes side walls 35, end walls 36 and a bottom wall 37 and a horizontally extending marginal flange member 31a extends therearound and provides a generally rectangular-shaped opening 32a for the reception of the depending marginal flange 30 of the next intermediate sectional unit 22 thereabove (FIG. 5).

A part of the area of each of the intermediate sectional units or trays 22 is divided by transverse partition members 38 and a central longitudinal partition member 39 into a plurality of compartments 40 for the reception of certain forms of fishing tackle, such, for example as smaller plugs and minnows, and the remaining area of each of the intermediate sectional units provides a larger compartment 41 for other and larger plugs and minnows fishing tackle or other equipment (FIG. 7).

A horizontally extending marginal shelf flange member 42 is attached to the side and end walls 35–36 of the bottom sectional unit 21, between the top and bottom thereof, and a tray 43 is slidably mounted on the shelf flange member 42 and occupies part of the area of the bottom sectional unit 21. This tray 43 is removable from the bottom sectional unit 21 through the open top thereof and is adapted to hold hooks, plugs, etc., whereas the body of the bottom sectional unit 21 is adapted to hold larger pieces of equipment, such as reels, and the like.

Thus, in the assembly of the form of the new multiple sectional fishing tackle box or container illustrated in FIGS. 1 to 10, inclusive, the lowermost one of the intermediate sectional units or trays 22 is assembled upon the bottom sectional unit 21, and the other intermediate sectional units or trays 22 are assembled with each other by nesting the depending marginal flanges 30 within the areas 32 defined by the horizontal marginal flanges 31. Similarly, the uppermost or top sectional unit 23 is nested with the next adjacent sectional unit therebelow by inserting the depending flange 30 thereon within the area 32 defined by the horizontal flange 31 on the intermediate sectional unit 22 disposed immediately therebelow, whereupon the hasp or latch unit 23 may be moved into operative position to latch the multiple sectional units or trays 21–22–23 in nested or assembled condition, in which they may be readily carried by the handle 26.

When it is desired to open the new multiple sectional unit fishing tackle box or container for use this may be readily accomplished by opening the hasp or latch units 23 and lifting out the top sectional unit 23, and one or more of the intermediate sectional units 22, as desired. During this operation each of the sectional units or trays 21–22–23–24 may be lifted out of the assembled or nested condition of the complete unit and used in a substantially small space, such as a rowboat or the like, without presenting a space problem as encountered heretofore in prior side folding fishing tackle boxes.

Moreover, due to the fact that the multiple sectional units or trays 21–22–23 are all assembled in vertical alignment the entire assembly requires substantially less space than is required by the prior side or laterally opening fishing tackle boxes or containers, and hence the new fishing tackle box has a distinct advantage when used in a small space such as a rowboat, or the like.

A modification of the invention is illustrated in FIGS. 11 to 14, inclusive, of the drawings, and those parts thereof which are similar to, or which correspond to, comparable parts in the form of the invention illustrated in FIGS. 1 to 10, inclusive, have been given the same reference numerals followed by the additional and distinguishing reference character "b."

In the form of the invention illustrated in FIGS. 11 to 14, inclusive, of the drawings, each of the multiple sectional units or trays 21b, 22b and 23b is provided with a side handle 44 by means of which each of the multiple sectional units or trays 21b–22b–23b may be carried independently, whereas the entire assembly may be carried by the top handle unit 26b.

However, the form of the invention illustrated in FIGS. 11–14 of the drawings differs from the form of the invention illustrated in FIGS. 1 to 10, inclusive, primarily in the means for holding the sectional units or trays 21b, 22b and 23b in nested assembled position. Thus, the means for this purpose, as employed in the form of the invention illustrated in FIGS. 11–14, includes upstanding latch pins 45 which are mounted at suitable spaced intervals on the horizontal flanges 31b. These latch pins 45 are adapted to be detachably inserted into corresponding latch openings 46 formed in the bottom wall 29b of each of the sectional units or trays disposed immediately thereabove, as best shown in FIGS. 13 and 14 of the drawings.

Thus, when it is desired to assemble the sectional units or trays 21b, 22b and 23b, in the form of the invention illustrated in FIGS. 11–14 of the drawings, this may readily be accomplished by inserting each upper sectional unit upon the sectional unit disposed immediately therebelow with the upstanding latch pins 45 extending through the latch openings 46 in the bottom wall 29b of the sectional unit disposed immediately thereabove.

Another modification of the invention is illustrated in FIGS. 15 and 16 of the drawings and those parts thereof which are similar to, or which correspond to, comparable parts in the form of the invention illustrated in FIGS. 1 to 10, inclusive, have been given the same reference numerals followed by the additional and distinguishing reference character "c."

Thus, the form of the invention illustrated in FIGS. 15 and 16 of the drawings is substantially similar to that illustrated in FIGS. 1 to 10, inclusive except that in this form of the invention the means for nesting the multiple sectional units or trays 21c, 22c and 23c in nested or assembled condition includes a continuous rounded depending marginal flange member 47 which is formed integrally in the bottom wall 29c in the top sectional unit 23c, and in each of the intermediate sectional units 22c, and this depending marginal flange member 47 is adapted to extend down between and lie closely adjacent to the horizontal flanges 31c within the area 21 defined by the marginal flange member 47.

Hence, when assembling the multiple sectional units 21c, 22c and 23c, in the form of the invention illustrated in FIGS. 15 and 16 of the drawings, this may readily be accomplished by inserting the lowermost one of the intermediate sectional units or trays 22c upon the bottom unit or tray 21c, and upon each other, and assembling the top unit 23c upon the uppermost intermediate unit 22c by inserting the depending marginal flange member 47 downwardly into the opening 31c and into position adjacent the horizontal flange 31c on the intermediate unit immediately therebelow.

Another modification of the invention is illustrated in FIGS. 17 and 18 of the drawings and those parts thereof which are similar to or which correspond to comparable parts in the form of the invention illustrated in FIGS. 1 to 10, inclusive, have been given the same reference characters followed by the additional and distinguishing reference character "d."

The form of the invention illustrated in FIGS. 17 and 18 of the drawings is substantially similar to that illustrated in FIGS. 1 to 10, inclusive, except that in this form of the invention the means for assembling the multiple sectional units 21d, 22d, and 23d in nested relationship upon each other includes a continuous depending flange member 48 which is formed as an integral depending extension of each of the bottom walls 29d of the top unit 23d, and of the intermediate units 22d, and this depending flange member 48 is generally V-shaped in cross section, as shown in FIGS. 17 and 18 of the drawings.

This depending flange member 48 includes a vertically extending inner wall portion 49 and an angularly extending web portion 50 which interconnects the bottom wall 29d and the vertically extending wall portion 48 (FIG. 18).

Hence, when assembling the multiple sectional units or trays 21d, 22d and 23d, which are embodied in the form of the invention illustrated in FIGS. 17 and 18, this may readily be accomplished by inserting each unit downwardly upon the unit immediately therebelow so that the vertically extending wall 49 of each of the depending flange members 48 lies snugly against the corresponding horizontal marginal wall flange 31d on the unit therebelow, and within the opening or area 32d, as best shown in FIG. 18 of the drawings.

It will thus be seen from the foregoing description, considered in conjunction with the accompanying drawings, that the present invention provides a new and improved multiple sectional unit fishing tackle box or container having the desirable advantages and characteristics and accomplishing its intended objects including those hereinbefore pointed out and others which are inherent in the invention.

I claim:

1. A multiple sectional unit fishing tackle box or container of sheet material comprising
   (1) a plurality of individual sectional fishing tackle box units of uniform horizontal cross section superimposed one upon the other in nested relationship and including
      (a) a bottom sectional unit;
      (b) a top sectional unit; and
      (c) an intermediate sectional unit disposed between the said bottom sectional unit and the said top sectional unit;
   (2) each of the said individual sectional fishing tackle box units including
      (a) a bottom wall;
      (b) side walls; and
      (c) end walls; and
   (3) the said intermediate sectional unit and the said bottom sectional unit each including
      (a) a generally horizontally and inwardly extending flange projecting inwardly from the top edge of the side walls and end walls thereof on the inner surface thereof; and the inner edges thereof providing
      (b) an opening;
   (4) means on the said top sectional unit cooperating with the said inwardly and horizontally extending flange on the said intermediate sectional unit to retain the said top sectional unit and the said intermediate sectional unit in closely nested assembled relationship; and
   (5) additional means on the said intermediate sectional unit cooperating with the said horizontally and inwardly extending flange on the said bottom sectional unit to retain the said intermediate sectional unit and the said bottom sectional unit in closely nested assembled relationship;
   (6) means cooperating with the said inwardly and horizontally extending flange on the next adjacent intermediate sectional unit immediately therebelow for retaining the said intermediate sectional units in closely nested assembled relationship;
   (7) individual latching means latching each of said units to the next adjacent unit, said intermediate sectional units having complementary latching elements adjacent their top and bottom edges;
   (8) the top section having a handle positioned centrally thereof.

2. A multiple sectional unit fishing tackle box or container as defined in claim 1, wherein said retaining means cooperating with the said inwardly and horizontally extending flange is an opening in the bottom wall of the next adjacent sectional unit receiving a pin member carried by the said inwardly and horizontally extending flange.

3. A multiple sectional unit fishing tackle box or container as defined in claim 1, wherein the retaining means on said top sectional unit and said intermediate sectional unit cooperating with said inwardly extending flange comprises a depending marginal flange, V-shaped in cross-section, and wherein said marginal flange has a vertical wall substantially in contact with the inner edge of said inwardly horizontally extending flange.

References Cited

UNITED STATES PATENTS

| | | | |
|---|---|---|---|
| 578,353 | 3/1897 | Nelson | 217—13 |
| 778,680 | 12/1904 | Klenk | 220—97 |
| 864,761 | 7/1907 | Erickson | 220—97 |
| 1,112,914 | 10/1914 | Stone | 220—97 |
| 1,321,097 | 11/1919 | Gonzales | 220—107 |
| 2,539,302 | 1/1951 | Fye | 220—20 |
| 2,559,203 | 7/1951 | Weiskopf | 312—346 |
| 3,012,762 | 12/1961 | Norris | 257—295 |
| 3,216,604 | 11/1965 | Munroe | 217—16 |

CHANCELLOR E. HARRIS, *Primary Examiner.*